(12) United States Patent
Ryu et al.

(10) Patent No.: US 10,558,875 B2
(45) Date of Patent: Feb. 11, 2020

(54) SYSTEM AND METHOD FOR DETERMINING STATE OF DRIVER (71) Applicants: HYUNDAI MOTOR COMPANY, Seoul (KR); KIA MOTORS CORPORATION, Seoul (KR)

(72) Inventors: Seong Sook Ryu, Seoul (KR); Jin Kwon Kim, Suwon-si (KR); Byoung Joon Lee, Suwon-si (KR); Sam Yong Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 100 days.

(21) Appl. No.: 15/804,749

(22) Filed: Nov. 6, 2017

(65) Prior Publication Data

US 2018/0330177 A1 Nov. 15, 2018

(30) Foreign Application Priority Data

May 11, 2017 (KR) .................. 10-2017-0058783

(51) Int. Cl.
*G06K 9/00* (2006.01)
*B60Q 9/00* (2006.01)
*B62D 15/02* (2006.01)

(52) U.S. Cl.
CPC ........... *G06K 9/00845* (2013.01); *B60Q 9/00* (2013.01); *B62D 15/021* (2013.01);
(Continued)

(58) Field of Classification Search
CPC .. B60K 28/063; B60K 37/06; B60Y 2400/90; G06K 2009/00738; G06K 9/00281; G06K 9/00845; G06K 9/00214; G06K 9/00832; G06K 9/621; G06K 9/4604; G08B 21/06; G08B 23/00; A61B 5/18; A61B 5/11; A61B 5/4809; A61B 5/7275; A61B 5/746; A61B 2503/22; G02B 2027/0187; G02B 27/017; B60R 2022/208; B60R 21/01552; B60R 25/01; B60R 21/0132; B60R 21/01542;
(Continued)

(56) References Cited

U.S. PATENT DOCUMENTS 6,856,873 B2 * 2/2005 Breed .................... B60N 2/002
180/271
7,413,047 B2 * 8/2008 Brown ................. B60K 28/063
180/272

(Continued)

FOREIGN PATENT DOCUMENTS

| JP | 2007-233475 A | 9/2007 |
| JP | 2010-128649 A | 6/2010 |
| JP | 2013-156707 A | 8/2013 |

*Primary Examiner* — Aklilu K Woldemariam
(74) *Attorney, Agent, or Firm* — Morgan, Lewis & Bockius LLP (57) ABSTRACT

A system for determining a state of a driver includes a face tracking device configured to detect coordinates and a direction vector of a face at intervals of a sampling time from a face image of the driver, an event detecting device configured to detect valid behavior of a vehicle as an event, and a determination device configured to determine an impaired state of the driver based on a reflex response time of the driver when the event is detected by the event detecting device.

13 Claims, 4 Drawing Sheets (52) U.S. Cl.
CPC ..... *G06K 9/00228* (2013.01); *G06K 9/00281* (2013.01); *B60Y 2400/90* (2013.01); *G06K 2009/00738* (2013.01)

(58) Field of Classification Search
CPC ... B60R 21/01548; B60R 25/04; B60R 25/25; B60N 2/002; B60N 2002/0272; G01S 17/026; G01S 15/04; G01S 15/06; H04W 4/046; H04W 4/40; B60Q 2300/41; B60Q 2300/42; B60W 40/08; G06F 3/0312; G06F 3/0421; G06F 19/00; G01C 21/3664; B62D 15/021; G05D 1/0027; G08G 1/166; G07C 5/02; G01N 22/00; G01R 27/06; G01V 5/0016; G01V 5/0025
USPC ....... 382/100, 154, 209, 255, 201, 118, 115; 340/575, 576
See application file for complete search history.

(56) References Cited

U.S. PATENT DOCUMENTS

| | | | | |
|---|---|---|---|---|
| 7,570,785 B2* | 8/2009 | Breed | ................ | B60K 28/066 382/100 |
| 8,239,336 B2* | 8/2012 | Le Roux | ................ | G06N 3/08 706/25 |
| 2003/0125855 A1* | 7/2003 | Breed | ................ | G06K 9/00832 701/36 |
| 2003/0151516 A1 | 8/2003 | Basir et al. | | |
| 2004/0129478 A1* | 7/2004 | Breed | ................ | B60N 2/002 180/273 |
| 2004/0239510 A1* | 12/2004 | Karsten | ................ | B60K 28/063 340/576 |
| 2005/0046584 A1* | 3/2005 | Breed | ................ | B60C 11/24 340/13.31 |
| 2006/0077052 A1* | 4/2006 | Matsuoka | ................ | G01S 13/56 340/471 |
| 2006/0208169 A1* | 9/2006 | Breed | ................ | B60N 2/002 250/221 |
| 2008/0292146 A1* | 11/2008 | Breed | ................ | B60N 2/002 382/118 |
| 2010/0033333 A1* | 2/2010 | Victor | ................ | A61B 5/7264 340/576 |
| 2010/0238034 A1* | 9/2010 | Gunaratne | ................ | A61B 5/18 340/575 |
| 2010/0322507 A1 | 12/2010 | Gunaratne | | |
| 2011/0077484 A1* | 3/2011 | Van Slyke | ................ | A61B 5/02416 600/324 |
| 2012/0069301 A1 | 3/2012 | Hirata | | |
| 2013/0012823 A1* | 1/2013 | Ripoll | ................ | A61B 5/021 600/479 |
| 2013/0021463 A1 | 1/2013 | Hatakeyama | | |
| 2013/0091081 A1* | 4/2013 | He | ................ | G06N 20/00 706/12 |
| 2013/0093603 A1* | 4/2013 | Tschirhart | ................ | A61B 5/18 340/902 |
| 2014/0139655 A1* | 5/2014 | Mimar | ................ | G08B 21/06 348/77 |
| 2014/0168399 A1* | 6/2014 | Plummer | ................ | B60Q 9/00 348/78 |
| 2014/0172467 A1* | 6/2014 | He | ................ | B60K 28/06 705/4 |
| 2014/0309806 A1* | 10/2014 | Ricci | ................ | B60R 25/1004 701/1 |
| 2014/0309870 A1* | 10/2014 | Ricci | ................ | B60W 50/14 701/36 |
| 2014/0355850 A1* | 12/2014 | Kelm | ................ | G06T 7/0012 382/128 |
| 2015/0154845 A1 | 6/2015 | Wu et al. | | |
| 2015/0168174 A1* | 6/2015 | Abramson | ................ | G01C 21/3697 701/408 |
| 2015/0317511 A1* | 11/2015 | Li | ................ | G06K 9/00288 382/118 |
| 2016/0001781 A1* | 1/2016 | Fung | ................ | B60W 40/08 701/36 |
| 2016/0019434 A1* | 1/2016 | Caldwell | ................ | G06K 9/4671 345/474 |
| 2016/0019458 A1* | 1/2016 | Kaufhold | ................ | G01S 7/417 342/25 F |
| 2016/0097853 A1* | 4/2016 | Kamo | ................ | G01S 13/345 342/70 |
| 2016/0216130 A1* | 7/2016 | Abramson | ................ | G01C 21/3626 |
| 2016/0306876 A1* | 10/2016 | Nichols | ................ | G06N 7/005 |
| 2016/0321776 A1* | 11/2016 | Zou | ................ | G06T 1/20 |
| 2016/0321777 A1* | 11/2016 | Jin | ................ | G06F 9/5016 |
| 2016/0350649 A1* | 12/2016 | Zhang | ................ | G06N 3/0454 |
| 2017/0116497 A1* | 4/2017 | Georgescu | ................ | A61B 6/032 |
| 2017/0148156 A1* | 5/2017 | Bregman-Amitai | ................ | G06T 7/0012 |
| 2017/0148433 A1* | 5/2017 | Catanzaro | ................ | G10L 15/02 |
| 2017/0154258 A1* | 6/2017 | Liu | ................ | G06N 3/0445 |
| 2017/0154413 A1* | 6/2017 | Yu | ................ | G06K 9/6223 |
| 2017/0279957 A1* | 9/2017 | Abramson et al. | ................ | H04M 1/72577 |
| 2017/0337687 A1* | 11/2017 | Wang | ................ | G06T 7/11 |
| 2018/0082212 A1* | 3/2018 | Faivishevsky | ................ | G06N 20/00 |
| 2018/0089553 A1* | 3/2018 | Liu | ................ | G06N 3/006 |
| 2018/0095450 A1* | 4/2018 | Lappas | ................ | B33Y 10/00 |
| 2018/0144214 A1* | 5/2018 | Hsieh | ................ | G06T 7/0012 |
| 2018/0144466 A1* | 5/2018 | Hsieh | ................ | G06F 19/00 |

\* cited by examiner

SYSTEM AND METHOD FOR DETERMINING STATE OF DRIVER

CROSS-REFERENCE TO RELATED APPLICATION

This application is based on and claims the benefit of priority to Korean Patent Application No. 10-2017-0058783, filed on May 11, 2017, in the Korean Intellectual Property Office, the disclosure of which is incorporated herein in its entirety by reference.

TECHNICAL FIELD

The present disclosure relates to a system and a method for determining a state of a driver, and more particularly, relates to technologies for determining a state (e.g., an impaired state) of the driver based on a reflex response time of the driver according to behavior of a vehicle.

BACKGROUND

In general, a driver in a normal state may unconsciously show a variety of reflex responses such as righting reflex to match his or her head to the orientation of his or her body in preparation for a tilt of the body and tilting reactions to respond not to falling when he or she loses his or her balance.

However, if the driver is in an impaired state or is tired due to drinking, drug-taking, or the like, since exercise reflex capacity is greatly reduced as compared with the normal state although he or she opens his or her eyes, he or she may perform simple driving of following lanes. However, if a preceding vehicle is stopped suddenly or if a vehicle of a next lane cuts in suddenly, the driver may fail to suitably cope with it to cause a traffic accident.

Conventional technologies for determining a state of a driver are mainly technologies for determining his or her drowsy driving. The technologies for determining the drowsy driving of the driver may detect his or her eyes from an image captured by a camera and may determine his or her drowsy driving based on a change in a shape of each of the eyes, or may detect his or her mouth from an image captured by the camera and may determine his or her drowsy driving based on a change in a shape of the mouth.

Such conventional technologies for determining the state of the driver may be based on a change in a shape of a feature point in his or her face, generated due to sleepiness, and may fail to detect an impaired driver who has no change (e.g., an eye closing phenomenon) in a shape of each of eyes or has no change in a shape (e.g., a yawn) of a mouth.

SUMMARY

The present disclosure has been made to solve the above-mentioned problems occurring in the prior art while advantages achieved by the prior art are maintained intact.

An aspect of the present disclosure provides a system and method for determining a state of a driver to determine his or her impaired state by determining his or her state based on his or her reflex response time according to behavior of a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system may include: a face tracking device configured to detect coordinates and a direction vector of a face at intervals of a sampling time from a face image of the driver; an event detecting device configured to detect valid behavior of a vehicle as an event; and a determination device configured to determine an impaired state of the driver based on a reflex response time of the driver if the event is detected by the event detecting device.

The determination device may be configured to, if an amount of movement of the face, calculated based on the coordinates of the face, is greater than a threshold value, determine that the driver has intentional motion.

The determination device may be configured to differentiate direction vectors of the face, detected in a first time interval before the event occurs, differentiate direction vectors of the face, calculated in a second time interval after the event occurs, and determine the impaired state of the driver based on a variance value of differential values of a direction vector in the second time interval and a variance value of differential values of a direction vector in the first time interval.

The determination device may be configured to set the variance value of the differential values of the direction vector in the first time interval to a reference variance value, sequentially calculate the variance values of the differential values of the direction vector in the second time interval, and, if the sum of sampling times of differential values corresponding to a variance value which meets a threshold range of the reference variance value among the calculated variance values is greater than a threshold value, determine that the driver is in the impaired state.

The determination device may be configured to, if the system is mounted on an autonomous vehicle, adjust a time when control of the vehicle is transferred to the driver if it is determined that the driver is in the impaired state.

According to another aspect of the present disclosure, a method may include: detecting, by a face tracking device, coordinates and a direction vector of a face at intervals of a sampling time from a face image of the driver, detecting, by an event detecting device, valid behavior of a vehicle as an event, and determining, by a determination device, an impaired state of the driver based on a reflex response time of the driver, if the event is detected.

The determining may include, if an amount of movement of the face, calculated based on the coordinates of the face, is greater than a threshold value, determining that the driver has intentional motion.

The determining may include differentiating direction vectors of the face, detected in a first time interval before the event occurs, differentiating direction vectors of the face, calculated in a second time interval after the event occurs, setting a variance value of differential values of a direction vector in the first time interval to a reference variance value, sequentially calculating variance values of differential values of a direction vector in the second time interval and calculating the sum of sampling times of differential values corresponding to a variance value which meets a threshold range of the reference variance value among the calculated variance values, and, if the calculated sum of the sampling times is greater than a threshold value, determining that the driver is in the impaired state.

The method may further include, if it is determined that the driver is in the impaired state, adjusting, by the determination device, a time when control of the vehicle is transferred to the driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
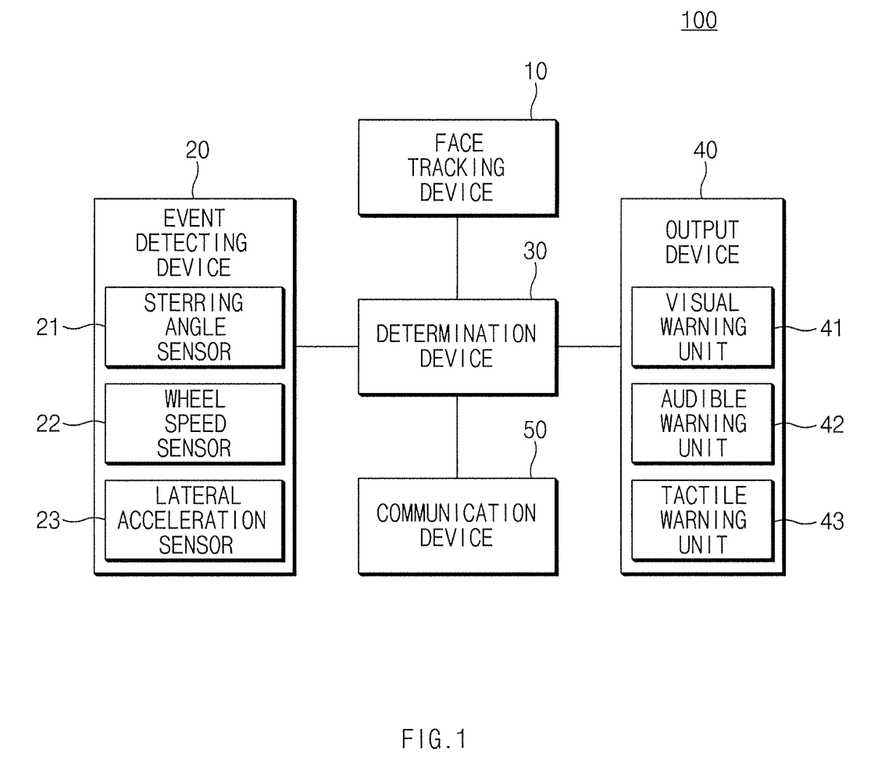
FIG. 1 is a block diagram illustrating a configuration of a system for determining a state of a driver according to an embodiment of the present disclosure.

FIG. 1 is a block diagram illustrating a configuration of a system for determining a state of a driver according to an embodiment of the present disclosure.

As shown in FIG. 1, a system 100 for determining a state of a driver according to an embodiment of the present disclosure may include a face tracking device 10, an event detecting device 20, a determination device 30, and an output device 40, and a communication device 50.

Seeing the respective elements, first of all, the face tracking device 10 may extract a feature point (e.g., eyes, eyebrows, lips, glasses, or the like) from a face image of the driver, captured by a camera of the system 100. Thereafter, the face tracking device 10 may detect a location of a feature point on a face coordinate system (x, y, z) generated with respect to a face center point. In this case, the face tracking device 10 may generate a face coordinate system with respect to a point in an image, rather than the face center point.

Further, the face tracking device 10 may calculate an amount of movement of a face of the driver and an amount of rotation of the face at intervals of a predetermined time based on a change in a location of a feature point on a face coordinate system according to motion of the face. In this case, the amount of movement of the face may indicate a movement distance of the face, generated by motion of a body of the driver, and the amount of rotation may refer to a direction vector indicating three-axis rotation angles (e.g., a roll angle, a pitch angle, and a yaw angle).

Further, the face tracking device 10 may store a location and a direction vector of the face in real time.

Herein, the way in which the face tracking device 10 detects the direction vector of the face is not limited to a specific way.

The event detecting device 20 may include various sensors, such as a steering angle sensor 21, a sensor 22 for sensing a speed of each wheel, and a lateral acceleration sensor 23, and may detect a left turn of a vehicle, a right turn of the vehicle, driving on a curved road, or driving over a speed bump as an event. In this case, the event detecting device 20 may detect if a steering angle is greater than a first reference value, if a deviation between left and right wheel speeds is greater than a second reference value, or if a lateral acceleration is greater than a third reference value, as a situation where a posture of the driver is tilted or where the driver looses his or her posture, as an event. Such an event may be used as information about a time when a reflex response of the driver is determined.

If the event is detected by the event detecting device 20, the determination device 30 may determine an impaired state of the driver based on the direction vector of the face, calculated by the face tracking device 10. The determination device 30 may be implemented with a hardware processor having software instructions to perform various functions described below.

In other words, the determination device 30 may differentiate direction vectors of the face, calculated during a predetermined time (hereinafter referred to as "first time interval") before a time when the event occurs and may differentiate direction vectors of the face, calculated during a predetermined time (hereinafter referred to as "second time interval") after the time when the event occurs.

The determination device 30 may calculate a time taken to return to a level where a variance value of differential values of a direction vector in the second time interval is less than or similar to a variance value of differential values of a direction vector in the first time interval.

In other words, the determination device 30 may set the variance value of the differential values of the direction vector in the first time interval to a reference variance value R and may sequentially calculate variance values of the differential values of the direction vector in the second time interval. If a specific variance value among the sequentially calculated variance values is within a threshold range of the reference variance value R, the determination device 30 may calculate a time taken, by adding sampling times of differential values used to calculate the specific variance value. In this case, the threshold range of the reference variance value R may meet, for example, '(R−V)<R<(R+V)'. Herein, 'V' may be a value randomly set by a designer according to a system environment.

Figure 3:
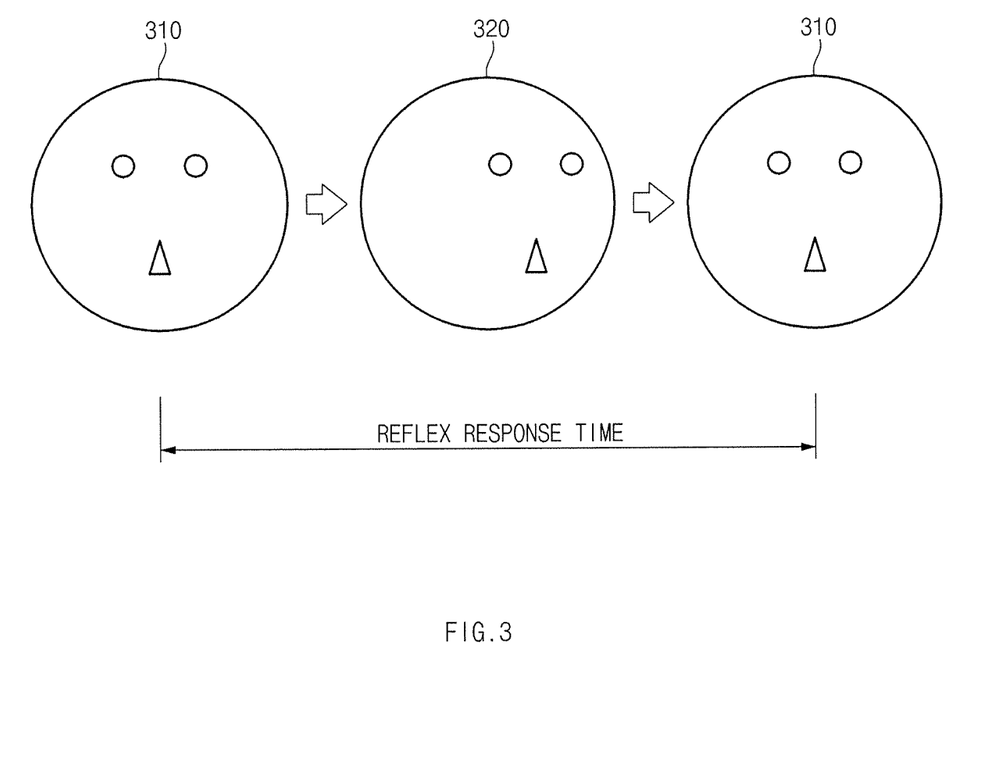
FIG. 3 is a drawing illustrating a reflex response time used for an embodiment of the present disclosure.

As a result, the determination device 30 may determine an impaired state of the driver based on his or her reflex response time. In other words, as shown in FIG. 3, the determination device 30 may determine the impaired state of the driver based on a time (a reflex response time) taken to change a face 310 of the driver before an event occurs to a face 320 while the event occurs and return to the face 310 of the driver before the event occurs.

Hereinafter, a description will be given in detail of an operation of the determination device 30.

For example, if differential values of a face direction vector sampled at intervals of 0.1 second in the first time interval are A1, A2, A3, A4, and A5 and if differential values of a face direction vector sampled at intervals of 0.1 second in the second time interval are B1, B2, B3, B4, and B5, a variance value of the differential values A1, A2, A3, A4, and A5 may be a reference variance value.

Thereafter, the determination device 30 may calculate a first variance value of the differential values B1 and B2 and may determine whether the calculated first variance value is included in a threshold range of the reference variance value.

If the first variance value is included in the threshold range of the reference variance value as a result of the determination, the determination device 30 may calculate a time taken at this time. In this case, since the time taken is the sum of sampling times for the first variance value of the differential values B1 and B2, it may be 0.2 seconds.

If the calculated time (0.2 seconds) taken is greater than a threshold time, the determination device 30 may determine that the driver is in an impaired state. If the calculated time (0.2 seconds) taken is less than or equal to the threshold time, the determination device 30 may determine that the driver is in a normal state.

If the first variance value is not included in the threshold range of the reference variance value as a result of the determination, the determination device 30 may calculate a second variance value using the differential values B1 to B3.

Thereafter, if the second variance value is included in the threshold range of the reference variance value, the determination device 30 may calculate a time taken at this time. In this case, since the time taken is the sum of sampling times for a variance value of the differential values, it may be 0.3 seconds.

If the calculated time (0.3 seconds) taken is greater than the threshold time, the determination device 30 may determine that the driver in an impaired state. If the calculated time (0.3 seconds) taken is less than or equal to the threshold time, the determination device 30 may determine that the driver is in the normal state.

The determination device 30 may sequentially perform this process with respect to all variance values in the second time interval and may determine a state of the driver.

If an amount of movement of the face, calculated by the face tracking device 10, is greater than a threshold value, the determination device 30 may determine that the driver has intentional motion to fail to be used as data for determining an impaired state of the driver.

The reason for that may reduce an error rate of determination of the system 100 to enhance performance of the system 100.

The determining of the state of the driver may be performed if an amount of movement of the face, calculated based on coordinates of the face, is less than or equal to a threshold value.

The output device 40 may include a visual warning unit 41, an audible warning unit 42, and a tactile warning unit 43, for warning a passenger of a vehicle of a danger.

The visual warning unit 41 may include a display, such as a liquid crystal display (LCD) or a head up display (HUD), a cluster, or the like and may output warning text or a warning light as a visual warning under control of the determination device 30.

The audible warning unit 42 may output a warning sound as an audible warning under control of the determination device 30. The warning sound may include a sound warning as well as a buzzer. In this case, the sound warning may be, for example, "Please stop your vehicle on the shoulder for safety.", "Please stop your vehicle on a safety zone.", or the like.

The tactile warning unit 43 may generate vibration as a tactile warning under control of the determination device 30. In other words, if it is determined that the driver is in an impaired state, the tactile warning unit 43 may vibrate a seat belt, a steering wheel, a gas pedal, a seat, or the like to warn.

The communication device 50 may communicate with a surrounding vehicle through vehicle to vehicle (V2V) communication. In other words, the communication device 50 may inform the surrounding vehicle that the driver is in the impaired state. The communication device 50 is electric circuitry which transmit and receive signals through wireless or hardware connections including data to and from a terminal within a distance via communication schemes, such as Low Frequency (LF), a Radio Frequency (RF), Wireless LAN, Wi-Fi, Bluetooth, Zigbee, Wi-Fi Direct (WFD, Ultra wideband (UWB), Infrared Data Association (IrDA), Bluetooth Low Energy (BLE), and Near Field Communication (NFC).

Further, the communication device 50 may inform a surrounding vehicle that the driver of the vehicle is in the impaired state, through vehicle to everything (V2X) communication. In this case, V2X may be collectively called V2V, vehicle to infrastructure (V2I), in-vehicle networking (IVN), vehicle to pedestrian (V2P), and the like.

If the present disclosure is applied to a fully autonomous vehicle or a partially autonomous vehicle and if it is determined that the driver is in the impaired state, the determination device 30 may adjust a time when control of the vehicle is transferred to the driver, may adjust a type of control transferred to the driver, or may make an emergency stop of the vehicle on a safety zone.

Figure 4:
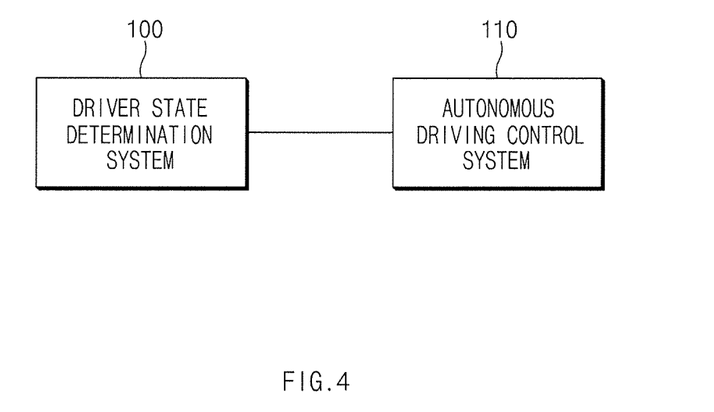
FIG. 4 is a block diagram illustrating an autonomous vehicle to which an embodiment of the present disclosure is applied.

In other words, as shown in FIG. 4, if it is determined that the driver is in the impaired state by the driver state determination system 100, an autonomous driving control system 110 may adjust a time when control of the vehicle is transferred to the driver, may adjust a type of control transferred to the driver, or may make an emergency stop of the vehicle on a safety zone.

In the present disclosure, an embodiment is exemplified as the face tracking device 10, the event detecting device 20, and the determination device 30 are implemented as separate elements. However, embodiments are not limited thereto. For example, the determination device 30 may be implemented in the form of performing both of the functions of the face tracking device 10 and the event detecting device 20.

Figure 2:
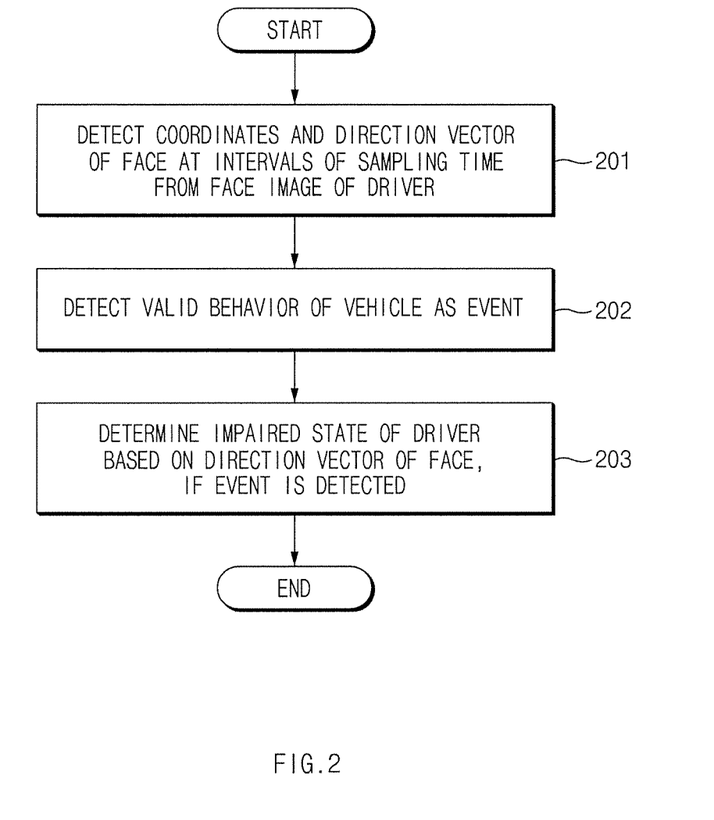
FIG. 2 is a flowchart illustrating a method for determining a state of a driver according to an embodiment of the present disclosure.

FIG. 2 is a flowchart illustrating a method for determining a state of a driver according to an embodiment of the present disclosure.

First of all, in operation 201, a face tracking device 10 of FIG. 1 may detect coordinates and a direction vector of a face of the driver at intervals of a sampling time from a face image of the driver.

In operation 202, an event detecting device 20 of FIG. 1 may detect valid behavior of a vehicle as an event.

In operation 203, if the event is detected by the event detecting device 20, the determination device 30 of FIG. 1 may determine an impaired state of the driver based on the direction vector of the face, detected by the face tracking device 10. In other words, the determination device 30 may differentiate direction vectors of the face, detected in a first time interval before the event occurs and may differentiate direction vectors of the face, calculated in a second time interval after the event occurs. The determination device 30 may set a variance value of differential values of a direction vector in the first time interval to a reference variance value and may sequentially calculate variance values of differential values of a direction vector in the second time interval, thus calculating the sum of sampling times of differential values corresponding to a variance value which meets a threshold range of the reference variance value among the calculated variance values. If the calculated sum of the sampling times is greater than a threshold time, the determination device 30 may determine that the driver is in an impaired state.

As a result, the determination device 30 may determine the impaired state of the driver based on his or her reflex response time.

The above-mentioned present disclosure may determine the impaired state of the driver by determining his or her state based on his or her reflex response time according to behavior of the vehicle.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A system for determining a state of a driver, the system comprising:
    a memory storing program instructions; and
    a processor configured to execute the program instructions, the program instructions when executed configured to:
        detect coordinates and a direction vector of a face at intervals of a sampling time from a face image of the driver,
        detect a valid behavior of a vehicle as an event, and
        determine an impaired state of the driver based on a reflex response time of the driver when the event is detected,
    wherein the program instructions when executed are further configured to:
        differentiate direction vectors of the face detected in a first time interval before the event occurs,
        differentiate direction vectors of the face calculated in a second time interval after the event occurs,
        determine the impaired state of the driver based on a variance value of differential values of a direction vector in the second time interval and a variance value of differential values of a direction vector in the first time interval, and
        determine that the driver is in the impaired state when a sum of sampling times of differential values corresponding to a variance value which meets a threshold range of a reference variance value among variance values of the differential values of the direction vector in the second time interval is greater than a threshold value.

2. The system of claim 1, wherein the program instructions when executed are further configured to, before determining that the driver is in the impaired state:
    set the variance value of the differential values of the direction vector in the first time interval to the reference variance value, and
    sequentially calculate the variance values of the differential values of the direction vector in the second time interval.

3. The system of claim 1, further comprising an output device configured to warn the impaired state of the driver.

4. The system of claim 3, wherein the output device is configured to warning of the impaired state of the driver through at least one of a visual warning, an audible warning, or a tactile warning.

5. The system of claim 1, wherein the program instructions when executed are further configured to adjust a time when control of the vehicle is transferred to the driver when the system is mounted on an autonomous vehicle and the driver is in the impaired state.

6. The system of claim 1, wherein the program instructions when executed are further configured to store the coordinates and the direction vector of the face.

7. The system of claim 1, wherein the program instructions when executed are further configured to detect any one of a left turn of the vehicle, a right turn of the vehicle, driving on a curved road, or driving over a speed bump as the event.

8. The system of claim 7, wherein the program instructions when executed are further configured to detect any one of whether a steering angle is greater than a first reference value, whether a deviation between left and right wheel speeds is greater than a second reference value, or whether a lateral acceleration is greater than a third reference value as the event.

9. A method for determining a state of a driver, the method comprising:
    detecting, by a face tracking device, coordinates and a direction vector of a face at intervals of a sampling time from a face image of the driver;
    detecting, by an event detecting device, a valid behavior of a vehicle as an event; and
    determining, by a determination device, an impaired state of the driver based on a reflex response time of the driver, when the event is detected,
    wherein the determining comprises:
        differentiating direction vectors of the face detected in a first time interval before the event occurs,
        differentiating direction vectors of the face calculated in a second time interval after the event occurs,
        setting a variance value of differential values of a direction vector in the first time interval to a reference variance value,
        sequentially calculating variance values of differential values of a direction vector in the second time interval;
        calculating a sum of sampling times of differential values corresponding to a variance value which meets a threshold range of the reference variance value among the calculated variance values, and
        determining that the driver is in the impaired state when the calculated sum of the sampling times is greater than a threshold value.

10. The method of claim 9, further comprising warning, by an output device, of the impaired state of the driver through at least one of a visual warning, an audible warning, or a tactile warning.

11. The method of claim 9, further comprising adjusting, by the determination device, a time at which control of the vehicle is transferred to the driver when it is determined that the driver is in the impaired state.

12. The method of claim 9, further comprising storing the detected coordinates and direction vector of the face.

13. The method of claim 9, wherein the detecting of a valid behavior of a vehicle as an event comprises detecting any one of whether a steering angle is greater than a first reference value, whether a deviation between left and right wheel speeds is greater than a second reference value, or whether a lateral acceleration is greater than a third reference value as the event.

\* \* \* \* \*